Jan. 29, 1963 T. J. GRECU 3,076,127
AUTOMATIC BATTERY CHARGER CONTROL CIRCUIT
Filed Sept. 3, 1959
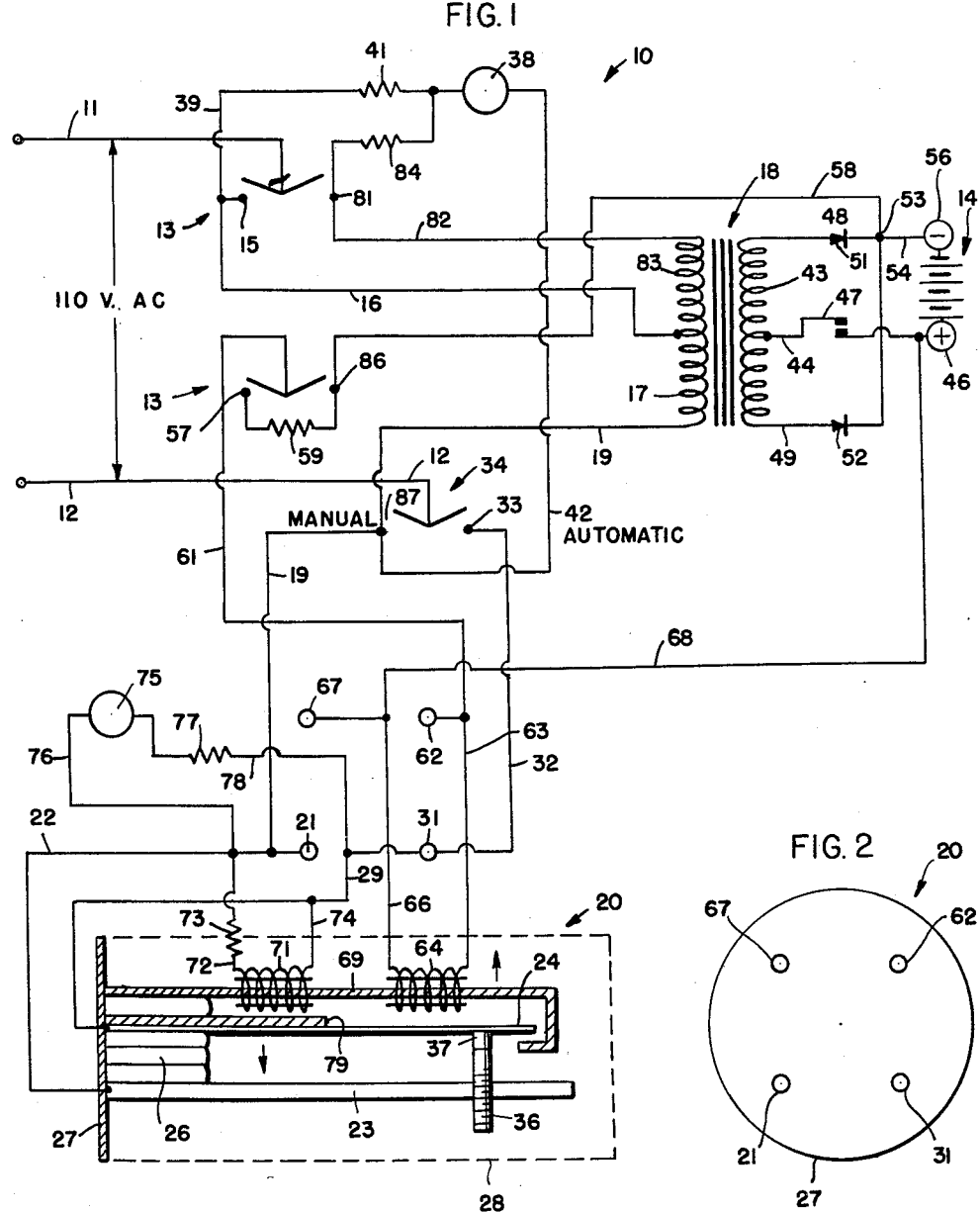
*INVENTOR:*
THOMAS J. GRECU
BY
Rummler and Snow
ATT'YS

United States Patent Office 3,076,127
Patented Jan. 29, 1963

3,076,127
AUTOMATIC BATTERY CHARGER CONTROL
CIRCUIT
Thomas J. Greca, 1821 W. North Ave., Chicago, Ill.
Filed Sept. 3, 1959, Ser. No. 837,890
7 Claims. (Cl. 320—36)

This invention relates generally to battery chargers, and has particular reference to an improved battery charger control circuit.

It is a principal object of this invention to provide an improved battery charger characterized by an automatic heat responsive switch capable of automatic operation when the battery is fully charged to open the charging circuit to the battery and capable when the battery is discharged to close the charging circuit thereto.

Another object is to provide an improved battery charger characterized by an automatic thermal switch operable to disconnect a power source from the system when the battery is fully charged and to connect the power source to the system when the battery is at a partly charged condition, thus automatically initiating a recharging cycle every time a minimum charge condition of the battery is reached during the discharge cycle thereof.

Still another object is to provide a battery charger characterized by a heat responsive switch operable to disconnect a power source from the system when the battery is fully charged, and operable to maintain the power source disconnected until the battery has reached a minimum charge condition.

Yet another object is to provide a heat responsive switch having structure correcting for the ambient in which it operates.

Other objects and important features of the invention will be apparent from the specification following taken with the drawing, which together describe and illustrate a preferred embodiment of the invention and what is now considered to be the best mode of practicing the principles thereof. Other embodiments of the invention may be suggested to those having the benefits of the teachings herein and such other embodiments are intended to be reserved especially as they fall within the scope of the appended claims.

In the drawing:

FIG. 1 is a schematic diagram illustrating a battery charger circuit having the improvements according to the present invention embodied therein; and FIG. 2 is a view of a support for a heat responsive switch employed in the charging circuit of FIG. 1.

Referring now to the drawing, the improved battery charger control circuit is referred to generally by the reference numeral 10 and includes a pair of power leads 11 and 12 which are connected across an alternating voltage source such as the conventional 110 v. A.C. single phase source. Lead 11 is connected in series with a double pole-double throw switch 13 adopting one of the two positions shown according to whether a battery 14 to be charged is of a six or a twelve volt type.

The examples of a 110 volt power supply and six or twelve volt batteries are for purposes of illustration only, and are not intended to be limitative of the invention herein.

When the switch 13 is closed to the twelve volt position shown at a contact 15 thereat, a circuit is made by a lead 16 to a primary winding 17 of a transformer 18, the circuit being completed through the primary 17 by a lead 19 to a terminal 21 associated with an automatic thermally operated battery charge control switch indicated generally by the reference numeral 20, see also FIG. 2. The terminal 21 is connected by a lead 22 to a conductor element 23 insulated from a spring leaf 24 by insulation members 26. The insulation members 26, conductor element 23 and spring leaf 24 are secured to a mounting base 27 of the thermal switch 20, and a housing 28 enclosing the switch 20 may be secured to base 27 in any convenient manner.

The spring leaf 24 is connected by a lead 29 to a terminal 31 supported by the mounting base 27. Terminal 21 likewise extends from mounting base 27 as seen in FIG. 2.

Terminal 31 is connected by a lead 32 to a contact 33 of a manual-automatic selector switch 34, the center pole of which is connected to the other supply line 12.

Conductor 23 has an adjustable contact 36 thereon which is normally closed against a contact 37 carried by the spring leaf 24, and it will thus be seen that the contacts 36 and 37 complete a circuit through the primary winding 17 of transformer 18.

The closing of the switch 13 to the twelve volt position shown, also closes a circuit through an indicating lamp 38 by means of a lead 39 having a dropping resistor 41 connected in series therewith, the circuit through the indicator lamp 38 being completed by a lead 42 connected to the lead 19.

The energization of the primary winding 17 of a transformer 18 energizes a secondary winding 43 thereof, which is center tapped as shown, a lead 44 being connected between the center tap of secondary winding 43 and anode 46 of the battery 14. A thermal switch 47 is connected in lead 44 and opens if battery 14 is directly shorted for any reason.

The opposite ends of the secondary 43 are connected to leads 48 and 49, rectifiers 51 and 52 respectively being connected in series therein, the rectified voltage developed in each half secondary winding being combined and connected at a terminal 53 connected by a lead 54 to a battery cathode 56.

A control circuit including the thermal switch 20 and the contacts 36 and 37 therein is designed to open the circuit supplying energy to the battery 14 when it is fully charged, the control circuit being responsive to the increase in electromotive force from the battery when it is fully charged. The closing of the switch 13 closes a contact 57 connected in a lead 58 having one end connected at the terminal 53 adjacent the battery cathode 56. The lead 58 also has a dropping resistor 59 connected in series therein, and the closing of the contact 57 completes a circuit including the lead 58, the dropping resistor 59, the contact 57 and a lead 61 connected to a terminal pin 62 of the thermally operated battery charge control switch 20, see also FIG. 2. A lead 63 from the terminal 62 is connected to a heater coil 64, the circuit therethrough being completed by a lead 66 to a terminal pin 67 of the switch 20. A lead 68 is also connected from the terminal 67 to the anode 46 of the battery 14, and it will be seen that the heater coil 64 is thus connected in parallel with the battery 14.

The coil 64 is wound around and insulated from a bimetal strip 69 secured in any convenient fashion to the insulation stack 26 which is secured to the mounting base 27, the terminals 21, 31, 62 and 67 extending therefrom, see FIG. 2. As the electromotive force of the battery 14, increases, the heat generated in the coil 64 will cause the bimetal strip 69 to flex, its movement being indicated by the arrow seen thereat, to raise the spring leaf 24 carrying the contact 37, the contacts 36 and 37 thereby opening.

The opening of the contacts 36 and 37 thus opens the circuit through the primary winding 17 of transformer 18, thus deenergizing secondary 43 and thereby interrupting the charging of battery 14.

Structure is provided for maintaining the contacts 36 and 37 in open condition at the end of the charging operation until such time as the battery again reaches a lower, partly charged condition. To this end, and as soon as the contacts 36 and 37 are opened a second heater coil 71 is energized, it formerly having been short circuited by the contacts 36 and 37 connected in parallel therewith. The coil 71 is also wound about the bimetal strip 69, and is connected to a lead 72 having resistor 73 connected in series therewith which adjusts the applied wattage to the coil 71. The other end of the coil 71 is connected by a lead 74 connected to the lead 29 and thence to the terminal pin 31.

Structure is also provided for indicating the conclusion of the battery charging operation, and to this end an indicator lamp 75 is connected in series with a lead 76 in turn connected to the terminal 21. The circuit through the lamp 75 is completed by a resistor 77 and a lead 78 to the other terminal 31. When the contacts 36 and 37 are closed, the circuit through the indicator lamp 75 is shorted out, and lamp 75 will not be illuminated until the contacts 36 and 37 are again opened.

Structure is also provided for adjusting for a rise in the ambient temperature which would cause the bimetal strip 69 to flex in the direction shown. To this end an additional bimetal strip 79 is provided, strip 79 bearing against the spring leaf 24. Upon an increase in the ambient temperature it flexes in the direction of the arrow shown thereat, so as to maintain an increased pressure between the contacts 36 and 37, the direction of flexing of bimetal strip 79 being opposite to the flexing of bimetal strip 69 as indicated by the arrows shown.

The description thus far has been in connection with the charging operation for a twelve volt battery and the description for six volt operation will now be had.

The double throw pole switch 13 is adapted to close on a contact 81 which completes a circuit from the power lead 11, through the contact 81 and a lead 82 to one end of a primary winding 83 of the transformer 18, the circuit through the primary winding of the transformer 18 now including the primary windings 83 and 17, and the circuit being completed by means of the line 19 and the leads previously described. The inclusion of the extra primary winding 83 provides the proper turns ratio so that a lower voltage is developed across the secondary 43 for a lower voltage battery 14.

The closing of switch 13 on contact 81 also places a resistor 84 in series with the lamp 22, the circuit therethrough being completed by the leads 42 and 19 as previously described.

Operation of the switch 13 to the six volt position also closes contact 86 which bypasses the resistor 59 employed in the circuit when a twelve volt battery is being charged.

For either kind of charging operation, whether a six or twelve volt battery is to be charged, the electromotive force therefrom will drop as the battery loses its charge. This will cause the heating effect of heater coil 64 to diminish greatly, causing the bimetal element 69 to move in a direction opposite to the arrow shown thereat to re-establish the power circuit at the contacts 36 and 37, the heating effect of the coil 71 not being sufficient to maintain contacts 36 and 37 open. It will be seen, therefore, as the battery 14 loses its charge to some predetermined value, the switch 20 will operate automatically to initiate a charging operation as previously described.

Structure is also provided for charging the battery manually, eliminating the automatic circuit as previously described, if desired. To this end, switch 34 has a contact 87 which is closed for manual operation, and when the switch 13 is in position for either twelve or six volt operation, battery 14 may be charged manually, the primary windings 17 and 83 being energized according to whether battery 14 is a twelve or six volt type. The circuit completed through the contact 87 of switch 34 is to the other supply lead 12 thereby passing the switch 20.

The thermal control switch 20 is automatically operated and can be wholly enclosed within the housing 28, which can be readily hermetically sealed, thus eliminating the possibility of foreign matter gaining entrance to the contacts therein.

The device according to the present invention also makes it unnecessary to employ meters or relays, and the cost thereof is substantially reduced thereby. Moreover, the indicating system consisting of the indicator lamps makes it possible for an inexperienced person to charge the battery, the automatic switch employed therewith eliminating the possibility of human error or the possibility of overcharging the battery.

While the invention has been described in terms of a preferred embodiment thereof, its scope is intended to be limited only by the claims here appended.

I claim:

1. A battery charger control circuit for automatically initiating a recharging cycle comprising, a source of charging voltage for a battery connected across said voltage source, switch means controlling the application of charging voltage to said battery, said switch means including a bimetallic element, first heating means in parallel with said battery and adapted to gradually radiate heat as a function of the charge on said battery, said first heating means operatively connected to said bimetallic element for moving said element into a switch means opening position to disconnect said source from said battery when a predetermined value of maximum charge thereon has been reached, second heating means in series with said source and operatively connected to said bimetallic element, said second heating means actuated only when said switch means is open and adapted to radiate heat less than sufficient to maintain said switch means open, said first and second heating means jointly maintaining said switch means open until a predetermined value of minimum charge is reached on said battery during the discharge cycle thereof, additional bimetallic means correcting for an increase in the ambient temperature for preventing opening of said switch means by the heating effect of said first heating means before said battery is charged to said maximum predetermined value in a higher ambient.

2. A battery charger control circuit for automatically initiating a recharging cycle comprising, a source of charging voltage for a battery connected across said voltage source, switch means controlling the application of charging voltage to said battery, said switch means including heat responsive means, first heating means in parallel with said battery and adapted to gradually radiate heat as a function of the charge on said battery, said first heating means operatively connected to said heat responsive means for opening said switch means to disconnect said source from said battery when a predetermined value of maximum charge thereon has been reached, second heating means in series with said source and operatively connected to said heat responsive means, said second heating means actuated only when said switch means is open and adapted to radiate heat less than sufficient to maintain said switch means open, said first and second heating means jointly maintaining said switch means open until a predetermined value of minimum charge is reached on said battery during the discharge cycle thereof, additional heat responsive means correcting for an increase in the ambient temperature for preventing opening of said switch means by the heating effect of said first heating means before said battery is charged to said predetermined maximum value in a higher ambient.

3. A battery charger control circuit for automatically initiating a recharging cycle comprising, a source of charging voltage for a battery connected across said voltage source, a thermally operated switch controlling the application of charging voltage to said battery, said switch including a bimetallic element, first heating coil in parallel with said battery and adapted to gradually radiate heat as a function of the charge on said battery, said first heating coil operatively connected to said bimetallic element for moving said element into a switch opening position to disconnect said source from said battery when a predetermined value of maximum charge thereon has been reached, second heating coil in series with said source and operatively connected to said bimetallic element, said second coil actuated only when said switch is open and adapted to radiate heat less than sufficient to maintain said switch open, said first and second heating coils jointly maintaining said switch open until a predetermined value of minimum charge is reached on said battery during the discharge cycle thereof.

4. A battery charger control circuit for automatically initiating a recharging cycle comprising, a source of charging voltage for a battery connected across said voltage source, switch means controlling the application of charging voltage to said battery, said switch means including a bimetallic element, first heating means in parallel with said battery and adapted to gradually radiate heat as a function of the charge on said battery, said first heating means operatively connected to said bimetallic element for moving said element into a switch means opening position to disconnect said source from said battery when a predetermined value of maximum charge thereon has been reached, second heating means in series with said source and operatively connected to said bimetallic element, said second heating means actuated only when said switch means is open and adapted to radiate heat less than sufficient to maintain said switch means open, said first and second heating means jointly maintaining said switch means open until a predetermined value of minimum charge is reached on said battery during the discharge cycle thereof.

5. A battery charger control circuit for automatically initiating a recharging cycle comprising, a source of charging voltage for a battery connected across said voltage source, switch means controlling the application of charging voltage to said battery, said switch means including heat responsive means, first heating means in parallel with said battery and adapted to gradually radiate heat as a function of the charge on said battery, said first heating means operatively connected to said heat responsive means for opening said switch means to disconnect said source from said battery when a predetermined value of maximum charge thereon has been reached, second heating means in series with said source and operatively connected to said heat responsive means, said second heating means actuated only when said switch means is open and adapted to radiate heat less than sufficient to maintain said switch means open, said first and second heating means jointly maintaining said switch means open until a predetermined value of minimum charge is reached on said battery during the discharge cycle thereof.

6. A battery charger control circuit for automatically initiating a recharging cycle comprising, a source of charging voltage for a battery connected across said voltage source, means for varying said voltage to a voltage corresponding to a battery being charged, switch means controlling the application of charging voltage to said battery, said switch means including a bimetallic element, first heating means in parallel with said battery and adapted to gradually radiate heat as a function of the charge on said battery, said first heating means operatively connected to said bimetallic element for moving said element into a switch means opening position to disconnect said source from said battery when a full charge thereon has been reached, second heating means in series with said source and operatively connected to said bimetallic element, said second heating means actuated only when said switch means is open and adapted to radiate heat less than sufficient to maintain said switch means open, said first and second heating means jointly maintaining said switch means open until a predetermined value of minimum charge is reached on said battery during the discharge cycle thereof, additional bimetallic means correcting for an increase in the ambient temperature for preventing opening of said switch means by the heating effect of said first heating means before said battery is fully charged in a higher ambient.

7. A battery charger control circuit for automatically initiating a recharging cycle comprising, a source of charging voltage for a battery connected across said voltage source, means for varying said voltage to a voltage corresponding to the battery being charged, switch means controlling the application of charging voltage to said battery, said switch means including heat responsive means, first heating means in parallel with said battery and adapted to gradually radiate heat as a function of the charge on said battery, said first heating means operatively connected to said heat responsive means for opening said switch means to disconnect said source from said battery when a full charge thereon has been reached, second heating means in series with said source and operatively connected to said heat responsive means, said second heating means actuated only when said switch means is open and adapted to radiate heat less than sufficient to maintain said switch means open, said first and second heating means jointly maintaining said switch means open until a predetermined value of minimum charge is reached on said battery during the discharge cycle thereof.

References Cited in the file of this patent

UNITED STATES PATENTS

| | | |
|---|---|---|
| 2,012,903 | Beeteem | Aug. 27, 1935 |
| 2,550,344 | Godshalk | Apr. 24, 1951 |
| 2,796,577 | Arnot | June 18, 1957 |
| 2,802,980 | Lapuyade | Aug. 13, 1957 |
| 2,955,245 | Payne et al. | Oct. 4, 1960 |